US007057502B2

(12) United States Patent
Kudo

(10) Patent No.: US 7,057,502 B2
(45) Date of Patent: Jun. 6, 2006

(54) VEHICLE DRIVE ASSIST APPARATUS

(75) Inventor: Shinya Kudo, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 184 days.

(21) Appl. No.: 10/869,670

(22) Filed: Jun. 15, 2004

(65) Prior Publication Data

US 2004/0257211 A1 Dec. 23, 2004

(30) Foreign Application Priority Data

Jun. 20, 2003 (JP) ............................ 2003-177255

(51) Int. Cl.
*B60Q 1/00* (2006.01)

(52) U.S. Cl. ...................... 340/435; 340/465; 340/466; 701/96

(58) Field of Classification Search ................ 340/903, 340/435, 937, 441, 475–477, 464–466; 701/301, 701/93, 96; 180/271, 280
See application file for complete search history.

(56) References Cited

U.S. PATENT DOCUMENTS 5,939,976 A * 8/1999 Sasaki et al. ............... 340/435
6,272,418 B1 * 8/2001 Shinmura et al. ............. 701/72
6,317,693 B1 * 11/2001 Kodaka et al. ............. 701/301
6,463,369 B1 * 10/2002 Sadano et al. ................ 701/28
6,483,442 B1 * 11/2002 Shimizu et al. .......... 340/932.2
2003/0139883 A1 * 7/2003 Takafuji et al. ............. 701/301

FOREIGN PATENT DOCUMENTS

JP 2001-101595 A1 4/2001

* cited by examiner

*Primary Examiner*—Jeffery Hofsass
*Assistant Examiner*—Jennifer Stone
(74) *Attorney, Agent, or Firm*—Darby & Darby

(57) ABSTRACT

An oncoming vehicle is detected on the basis of images captured by CCD cameras when an own vehicle is making a turn with passing over an oncoming lane at an intersection. On this occasion, after the own vehicle has reached a predetermined turning state, by extracting three-dimensional objects having speed components Vnz not lower than a first threshold in the longitudinal direction of the own vehicle and in a direction along which the oncoming vehicle is coming closer to the own vehicle and having other speed components Vnx not lower than a second threshold in the lateral direction of the same and by detecting an oncoming vehicle out of the extracted three-dimensional objects, even in the case, for example, where the oncoming vehicle apparently moves in an image screen from obliquely left ahead of the own vehicle toward obliquely right behind of the same, the oncoming vehicle is properly detected.

12 Claims, 5 Drawing Sheets

VEHICLE DRIVE ASSIST APPARATUS

This application claims benefit of Japanese Application No. 2003-177255 filed on Jun. 20, 2003, the contents of which are incorporated by this reference.

BACKGROUND OF THE INVENTION

1. Field of the Invention

The present invention relates to a vehicle drive assist apparatus capable of properly detecting an oncoming vehicle running in an opposite lane when making a turn at an intersection or the like.

2. Description of the Related Art

In order to improve safety during running of a vehicle, there have been proposed a variety of vehicle drive assist apparatuses detecting an oncoming vehicle running in an opposite lane and giving an alarm to a driver or performing a vehicle driving control such as a brake control on the basis of detected information of the oncoming vehicle when the vehicle is making a turn, for example, to the right at an intersection.

For example, Japanese Unexamined Patent Application Publication No. 2001-101595 discloses an art in which infrastructural systems including road-condition-detecting apparatuses disposed on roads including intersections are installed, and, when making a turn, for example, to the right at an intersection, a vehicle-mounted apparatus recognizes an oncoming vehicle with a road-vehicle communication between one of the infrastructural systems and the vehicle-mounted apparatus so as to give a warning or the like to a driver.

However, the art making use of the above-described infrastructural systems requires the infrastructural system to be installed at each intersection and accordingly a huge amount of fund to be raised for installing a rightward-turn warning system or the like at each intersection. Also, a scheme of actual deployment of such infrastructural systems must be made. Hence, putting the above-described art into practical use so as to be operable on a large scale is difficult.

SUMMARY OF THE INVENTION

In view of the above-mentioned problems, the present invention has been made. Accordingly, it is an object of the present invention to provide a vehicle drive assist apparatus accurately detecting an oncoming vehicle when an own vehicle is making a turn, with a simple structure and without relying on infrastructural systems and the like.

A vehicle drive assist apparatus according to the present invention includes forward-environment-recognizing means stereoscopically recognizing at least one three-dimensional object (hereinafter, simply referred to as 3D object) ahead of an own vehicle by processing images captured by an imaging device installed in the own vehicle; and oncoming-vehicle-detecting means detecting the 3D object, having a speed component not lower than a first threshold in the longitudinal direction of the own vehicle and in a direction along which the 3D object is coming closer to the own vehicle and having another speed component not lower than a second threshold in a turning direction of the own vehicle, as an oncoming vehicle when the own vehicle is making a turn at an intersection.

DESCRIPTION OF THE PREFERRED EMBODIMENTS

Figure 1:
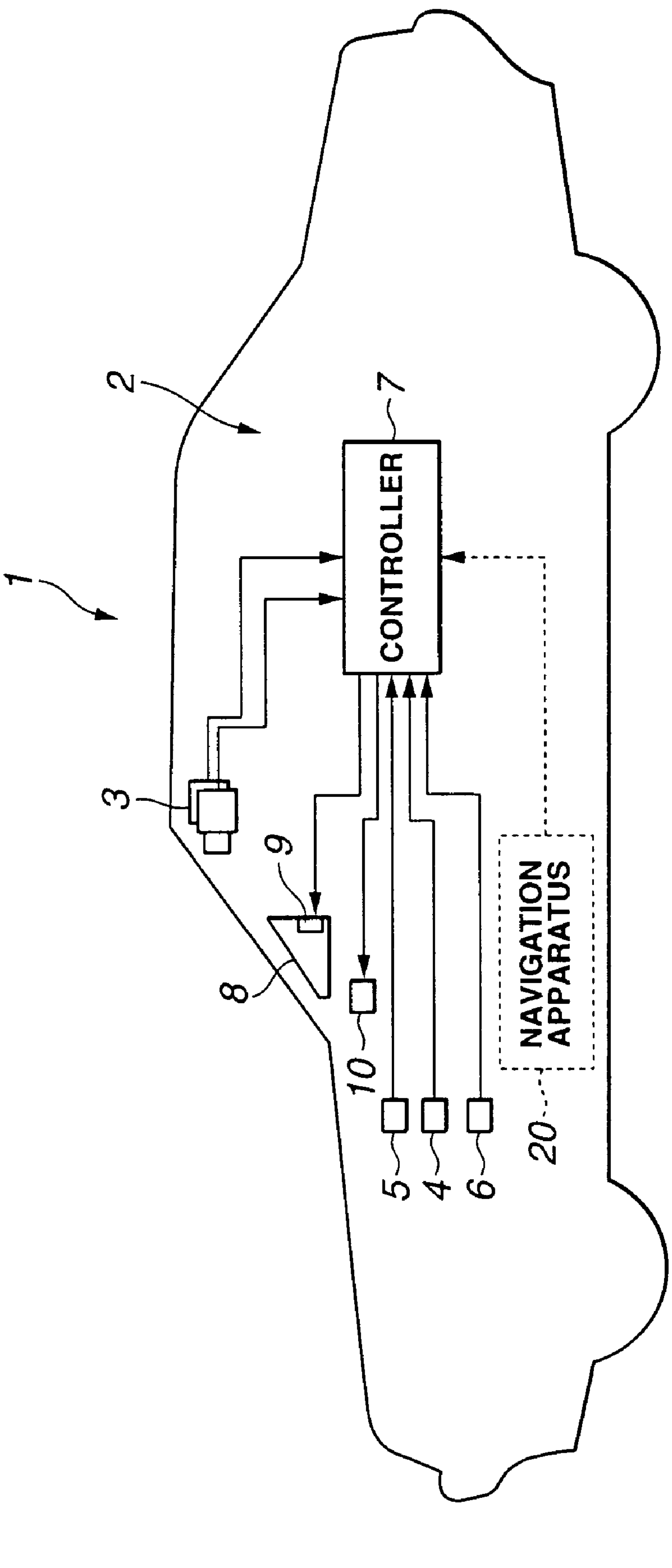
FIG. 1 is a schematic view of the structure of a vehicle having a vehicle drive assist apparatus mounted thereon.
Figure 2:
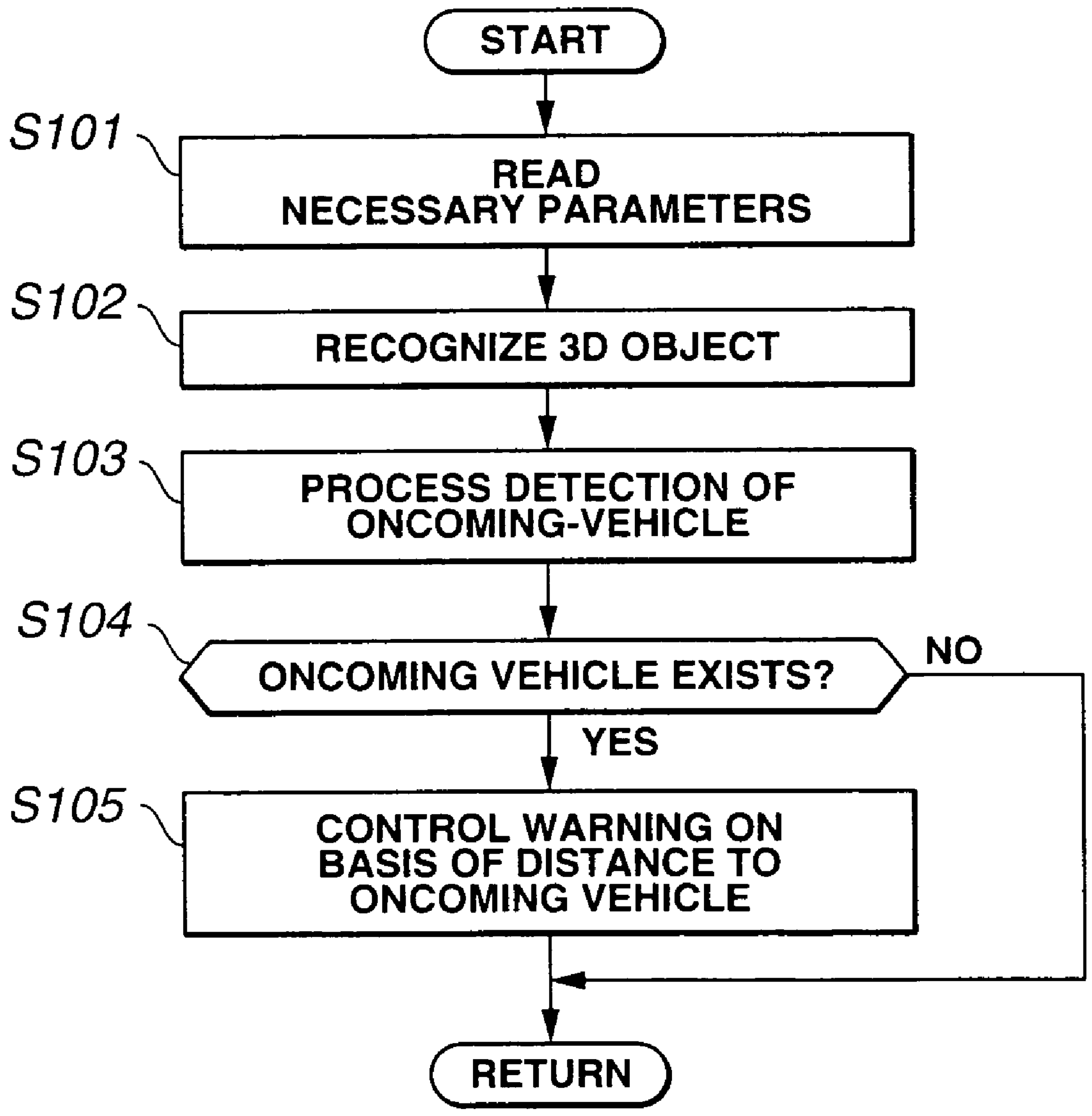
FIG. 2 is a flowchart of a driving assist control program.
Figure 3:
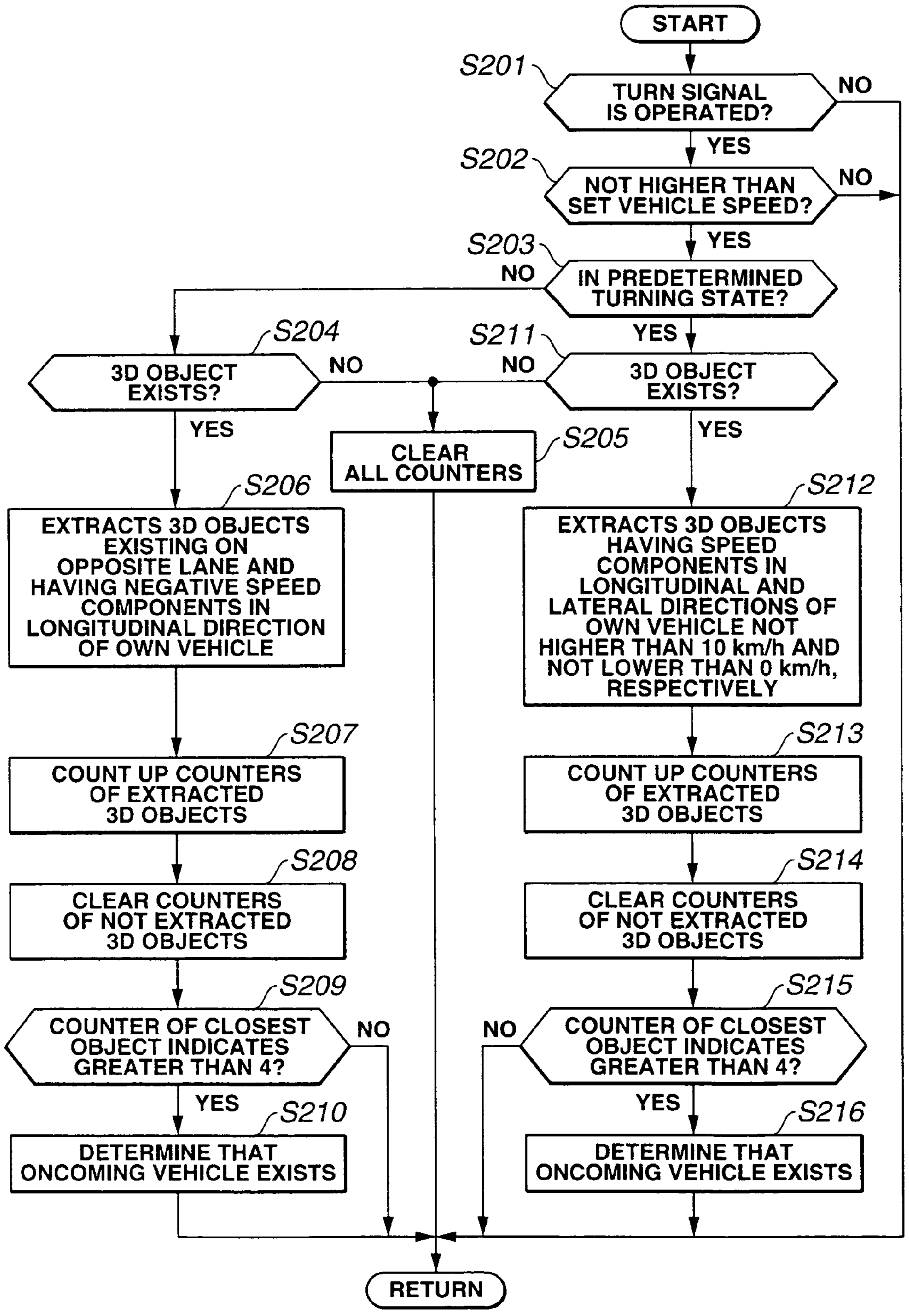
FIG. 3 is a flowchart of an oncoming-vehicle-detecting process routine.
Figure 4:
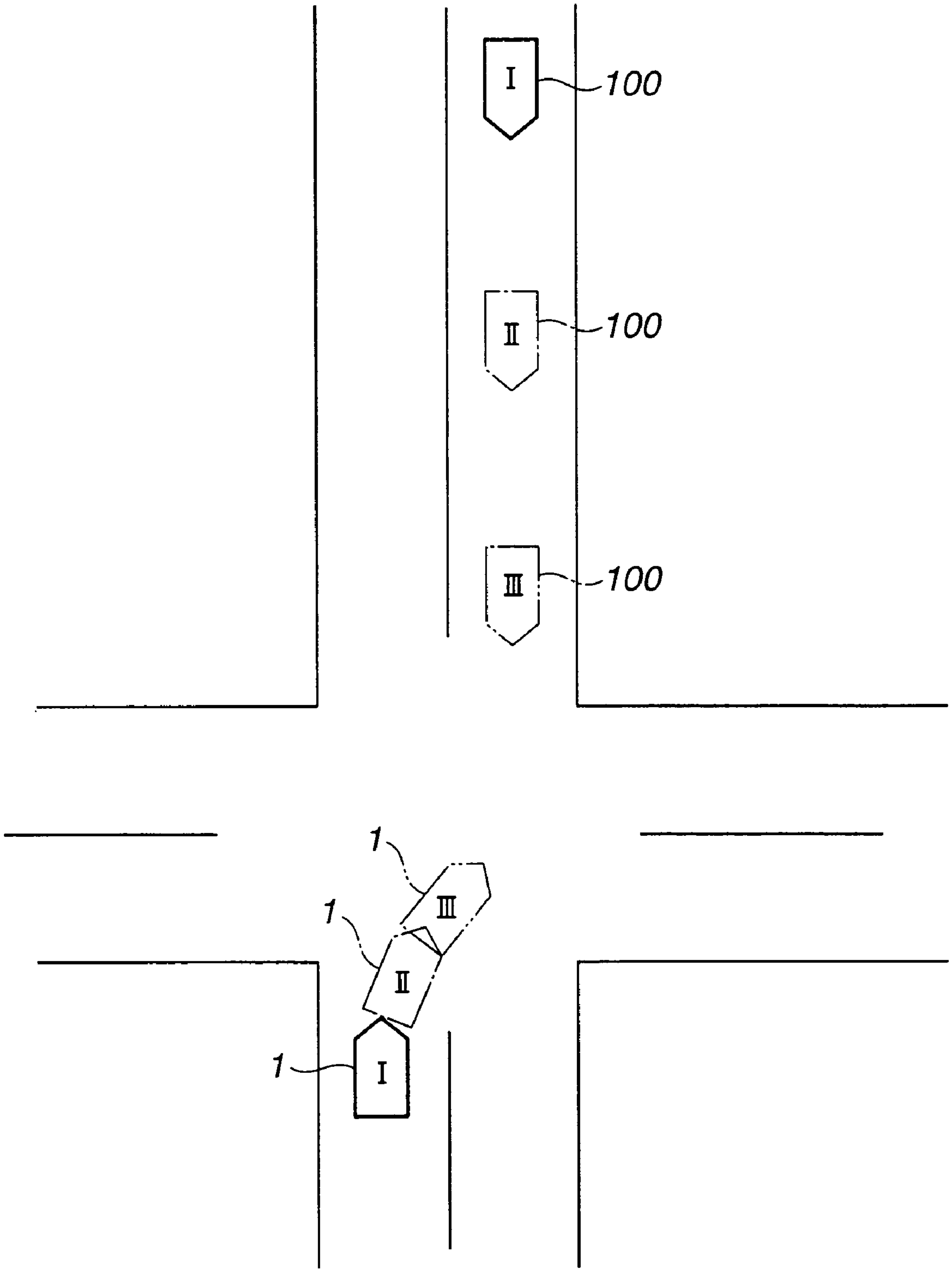
FIG. 4 illustrates a behavior of an own vehicle making a turn to the right at an intersection.
Figure 5:
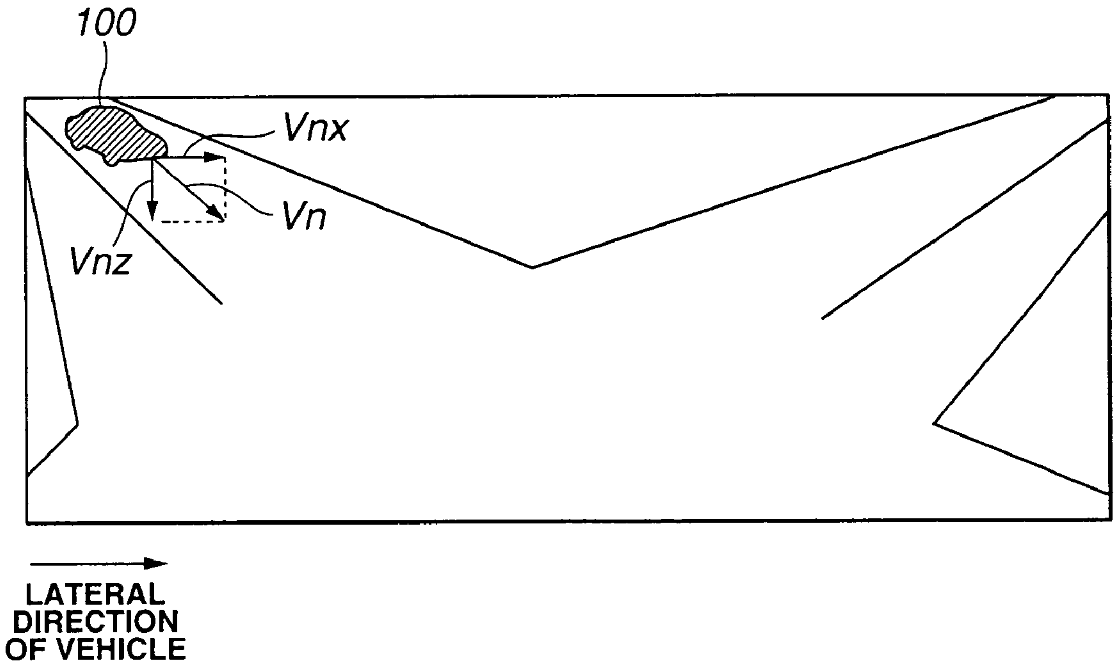
FIG. 5 illustrates a behavior of an oncoming vehicle recognized from images when the own vehicle is making a turn to the right.

Preferred embodiments of the present invention will be described with reference to the attached drawings. FIG. 1 is a schematic view of the structure of a vehicle having a vehicle drive assist apparatus mounted thereon, according to an embodiment of the present invention, FIG. 2 is a flowchart of a driving assist control program, FIG. 3 is a flowchart of an oncoming-vehicle-detecting process routine, FIG. 4 illustrates a behavior of an own vehicle when making a turn to the right at an intersection, and FIG. 5 illustrates a behavior of an oncoming vehicle recognized from images when the own vehicle is making a turn to the right.

As shown in FIG. 1, a vehicle (own vehicle) 1 such as an automobile has a vehicle drive assist apparatus 2 mounted thereon, detecting existence of an oncoming vehicle when making a turn to the right at an intersection or the like and giving a warning or the like to a driver.

The vehicle drive assist apparatus 2 includes a pair of right and left CCD cameras 3 serving as a stereoscopic optical system, each composed of solid-state imaging element such as a charge-coupled device (CCD). These right and left CCD cameras 3 make up an imaging device stereoscopically capturing an image of an object out of the vehicle from different points of view and are fixed on the front part of the ceiling of the vehicle compartment at a predetermined interval.

Also, the vehicle 1 has a vehicle speed sensor 4 detecting a vehicle speed (own-vehicle speed) V, a turn signal switch 5 operated by a driver when the vehicle 1 makes a turn to the right or to the left, a steering angle sensor 6 detecting a steering wheel angle δ, a controller 7, and so forth, disposed therein. A variety signals of the own-vehicle speed V and the steering wheel angle δ detected by the foregoing components, including operation signals of the turn signal switch 5 (OFF, rightward-turn ON, and leftward-turn ON operation signals), are inputted into the controller.7 together with image signals in the running direction of the own vehicle 1, captured by the CCD cameras 3.

Thus, as will be described in detail later with reference to the flowchart illustrated in FIG. 2, when the oncoming vehicle exists during the own vehicle 1 making a turn to the right, the controller 7 activates, for example, an alarm lamp 9 (notifying means) and a warning buzzer 10 (notifying means) installed on a combination meter 8 so as to call driver's attention.

More particularly, the controller 7 is made up by a system of multi-microprocessors including, for example, an image processor and processes image signals from the CCD cameras 3 as described below, for example. First, the controller 7 processes a pair of stereo images of forward environments in the running direction of the own vehicle 1, captured by the CCD cameras 3 so as to obtain distance information across the entire images by using the principle of triangulation on the basis of a shifted amount of the corresponding positions, and generates a distance image representing a three-dimensional distance distribution. Then, the controller 7 applies a known grouping process on this data and extracts white line, i.e., center line data, sidewall data of guardrails, curbstones, and the like existing along roads, and three-dimensional object (hereinafter, simply referred to as 3D object) data of a vehicle and the like by comparing each piece of grouped data with frames (windows) of previously stored stereoscopic road-shape data, sidewall data, 3D object data, and so forth.

Each piece of the white line data, sidewall data, and 3D object data extracted as mentioned above has its own number n allotted thereto, which is different from those of the remaining pieces of the data. In addition, the 3D object data is broken down into three types data of an immovable object, a forwardly moving object having a speed component in the same direction as that of the own vehicle 1 (that is, a positive speed component Vnz in the longitudinal forward direction of the own vehicle 1), and a backwardly moving object having a speed component in the opposite direction to that of the own vehicle 1 (that is, a negative speed component Vnz in the longitudinal forward direction of the own vehicle 1), on the basis of a relative change in distance from the own vehicle 1 and a vehicle speed of the own vehicle 1.

With this arrangement, upon detecting a rightward turn of the own vehicle 1 on the basis of a driving state of the own vehicle 1, the controller 7 detects the oncoming vehicle on the basis of speed components of the backwardly moving object (that is, speed components Vnz and Vnx in the longitudinal and lateral directions of the own vehicle 1, respectively, wherein a positive value of Vnx is given, for example, when the oncoming vehicle moves laterally from left to right in the lateral direction of the own vehicle 1), and so forth. Thus, when the controller 7 detects the oncoming vehicle during making a turn to the right, the controller 7 activates the alarm lamp 9 and the warning buzzer 10 in accordance with a position of the oncoming vehicle. In other words, the controller 7 serves as forward-environment-recognizing means, oncoming-vehicle-detecting means, turning-occasion-determining means, and turning-state-determining means.

Referring now to the flowchart of the driving assist control program illustrated in FIG. 2, the control program executed by the controller 7 will be described. The program is executed at a predetermined time interval. First, the controller 7 reads necessary information and parameters in step S101. To be specific, the controller 7 reads image signals from the CCD cameras 3, a vehicle speed V from the vehicle speed sensor 4, an operation signal from the turn signal switch 5, and the steering wheel angle δ from the steering angle sensor 6.

In the subsequent step S102, the controller 7 extracts and recognizes 3D objects and so forth on the basis of image information from the CCD cameras 3 as described above.

Then, when going to step S103, the controller 7 performs a detection process of the oncoming vehicle, following an oncoming-vehicle-detection process routine, which will be described later. Subsequently, the controller 7 goes to step S104 and determines whether or not the oncoming vehicle is detected in step S103.

As a result of determination in step S104, the controller 7 immediately exits the routine or goes to step S105, respectively, when the oncoming vehicle is not detected or is detected.

When going to step S105 upon detecting the oncoming vehicle, the controller 7 outputs signals for activating the alarm lamp 9 and the warning buzzer 10 on the basis of the distance between the oncoming vehicle and the own vehicle 1 and exits the routine. A generation interval of a warning sound by the warning buzzer 10 is controlled, for example, so as to be at a higher frequency as the distance to the detected oncoming vehicle is smaller, and to be at a lower frequency as the distance to the detected oncoming vehicle is greater. Also, a volume of the warning sound by the warning buzzer 10 is controlled so as to be relatively larger as the distance to the oncoming vehicle is smaller than that in the case where the distance is greater.

Next, the oncoming-vehicle-detecting process routine in step S103 will be described with reference to the flowchart shown in FIG. 3. When the routine starts, the controller 7 first checks in step S201 whether or not a turn signal operation for making a turn to the right is made, that is, an operation signal of the turn signal switch 5 for making a turn to the right is ON.

When the controller 7 determines in step S201 that no turn signal operation for making a turn to the right is made, the controller 7 immediately exits the routine.

In the meantime, when the controller 7 determines in step S201 that an operation signal of the turn signal switch 5 for making a turn to the right is ON and the turn signal operation for making a turn to the right is performed, the controller 7 goes to step S202. In step S202, the controller 7 checks whether or not the present own-vehicle speed V is not higher than a set vehicle speed (for example, 15 km/h).

The controller 7 immediately exits the routine or goes to step S203, respectively, when determining in step S202 that the present own-vehicle speed V is higher or not higher than the set vehicle speed.

In other words, the controller 7 goes to step S203 so as to be in an oncoming-vehicle-detecting mode during a making a turn to the right at the intersection when determining that the turn signal operation for making a turn to the right is made and also the own-vehicle speed V is not higher than the set vehicle speed.

When going from step S202 to step S203, the controller 7 checks whether or not the own vehicle 1 is now in a predetermined state of making a turn to the right. That is, the controller 7 checks whether or not the own vehicle 1 is now in a predetermined state of making a turn to the right at the intersection by checking the moving distance of the own vehicle 1 after a driver turns the steering wheel to the right on the basis of, for example, the own-vehicle speed V and the steering wheel angle δ. Meanwhile, those skilled in the art will appreciate that, for example, a navigation apparatus 20 is connected to the controller 7 as shown in FIG. 1 with a broken line, and a determination in step S203 is made on the basis of road information inputted from the navigation apparatus 20 to the controller 7, vehicle position information on roads, and so forth.

When determining in step S203 that the own vehicle 1 has not reached a predetermined turning state, the controller 7 goes to step S204. Meanwhile, a state in which the own vehicle 1 has not reached a predetermined turning state represents an initial state in which the own-vehicle 1 starts making a turn to the right, that is, an example state I shown in FIG. 4 in which the own vehicle 1 lies facing with the opposite lane juxtaposed to its own cruising lane (and with the oncoming vehicle 100 running in the opposite lane) in a substantially frontal fashion.

When going from step S203 to step S204, the controller 7 checks whether or not 3D objects are extracted in the foregoing image processing in step S102. When determining that no 3D object exists (no 3D object has been extracted), the controller 7 goes to step S205. In step S205, the controller 7 clears all counters tn, which will be described later, to zero and then exits the routine.

When determining in step S204 that 3D objects exist, the controller 7 goes to step S206. In step S206, the controller 7 extracts, for example, four 3D objects having negative speeds Vnz in the longitudinal direction of the own vehicle 1 in the order of being closer to the own vehicle 1 from those existing in the opposite lane (that is, four backwardly moving objects). In other words, in step S206, the controller 7 recognizes the opposite lane juxtaposed to the own cruising lane on the basis of the white line and the like extracted in step S102 and extracts 3D objects existing in the opposite lane and having negative speed components Vnz (for example, equal to −18 km/h or lower) in the longitudinal direction of the own vehicle 1.

When going from step S206 to step S207, the controller 7 counts up a counter tn corresponding to a reference number n of each of the 3D objects extracted this time (that is, tn is counted up to tn+1) and goes to step S208. In step S208, the controller 7 clears counters tn to zero, corresponding to 3D objects which are not extracted this time, and then goes to step S209.

When going from step S208 to step S209, the controller 7 checks whether or not a counter tn corresponding a 3D object closest to the own vehicle 1 indicates a value, for example, equal to 4 or greater. When the counter tn indicates a value smaller than 4, the controller 7 immediately exits the routine.

When determining in step S209 that the counter tn corresponding to the 3D object closest to the own vehicle 1 indicates a value equal to 4 or greater, the controller 7 goes to step S210. In step S210, upon recognizing this 3D object as the oncoming vehicle, the controller 7 determines that the oncoming vehicle presently running toward the own vehicle 1 exists and then exits the routine. In other words, under the condition that a 3D object in question is continuously detected in a plurality of frames (for example, at least 4 frames), the controller 7 determines that the oncoming vehicle exists.

In the meantime, as shown in FIG., 4, when further making a turn to the right and upon reaching the predetermined turning state at the intersection, the own vehicle 1 confronts the opposite lane and the oncoming vehicle 100 running in the opposite lane at a predetermined angle (see a state II or III shown in FIG. 4). In this case, for example, as shown in FIG. 5, the oncoming vehicle 100 running in the opposite lane toward the own vehicle 1 is recognized in the image screen as a backwardly moving object apparently moving at a speed Vn from obliquely left ahead of the own vehicle 1 toward obliquely right behind of the same. Also, when the own vehicle 1 has reached the predetermined turning state at the intersection, a road to be recognized as that including the own cruising lane (and the opposite lane) is changed to that toward which the own vehicle 1 is to make a turn to the right.

In view of the above situation in mind, in the case of determining in step S203 that the own vehicle 1 has reached the predetermined turning state, the controller 7 recognizes the oncoming vehicle by performing a different process from those in the foregoing steps S204 to step S210 in order to prevent the oncoming vehicle from disappearing or being wrongly recognized in such a turning state.

That is, when going to from step S203 to step S211, the controller 7 checks whether or not 3D objects are extracted by image processing in the foregoing step S102. When determining that no 3D object exists (no 3D object is extracted), the controller 7 goes to step S205. In step S205, the controller 7 clears all counters tn corresponding to all 3D objects to zero and then exits the routine.

When determining in step S211 that 3D objects exist, the controller 7 goes to step S212. In step S212, the controller 7 extracts, for example, four 3D objects (backwardly moving objects) in the order of being closer to the own vehicles 1, having speed components Vnz in the longitudinal direction of the own vehicle 1 not higher than a set threshold (for example, −10 km/h), and, in addition to having speed components Vnx in the lateral direction of the own vehicle 1 not lower than a set threshold (for example, 0 km/h). In other words, in step S212, the controller 7 extracts, for example, four 3D objects in the order of being closer to the own vehicle 1, each having a speed component Vnz not lower than a first threshold in the longitudinal direction of the own vehicle 1 (for example, 10 km/h) and in a direction along which the 3D objects are coming closer to the own vehicle, in addition to having a speed component Vnx in the lateral direction of the own vehicle 1 not lower than a second threshold (for example, 0 km/h) in a turning direction of the own vehicle 1.

When going from step S212 to step S213, the controller 7 counts up a counter tn corresponding to a reference number n of each of the 3D objects extracted this time (that is, tn is counted up to tn+1) and goes to step S214. In step S214, the controller 7 clears counters tn to zero, corresponding to 3D objects which are not extracted this time and then goes to step S215.

When going from step S214 to step S215, the controller 7 checks whether or not a counter tn corresponding a 3D object closest to the own vehicle 1 indicates a value, for example, equal to 4 or greater. When the counter tn indicates a value smaller than 4, the controller 7 immediately exits the routine.

When determining in step S215 that the counter tn corresponding to the 3D object closest to the own vehicle 1 indicates a value equal to 4 or greater, the controller 7 goes to step S216. In step S216, recognizing this 3D object as the oncoming vehicle, the controller 7 determines that the oncoming vehicle presently running toward the own vehicle 1 exists and then exits the routine. In other words, under the condition that a 3D object in question is continuously detected in a plurality of frames (for example, at least 4 frames), the controller 7 determines that the oncoming vehicle exists.

Since the above-described embodiment detects, on the basis of images captured by the pair of CCD cameras 3 installed in the compartment, the vehicle drive assist apparatus can detect the oncoming vehicle when the own vehicle 1 makes a turn to the right without relying on infrastructural systems or the like installed on roads and with a simple structure.

In this case, the imaging device made up by the CCD cameras 3 and so forth can be generally set so as to have a wider angle of view than that of a laser-radar device or the like. Since the imaging device having such a wide angle view is used so as to detect a 3D object, desired information out of the vehicle can be detected without requiring the CCD cameras 3 and the like to operate in accordance with a turn operation of the own vehicle 1 to the right.

After detecting the own vehicle 1 lying in a predetermined state of making a turn to the right at the intersection by using the imaging device having such a wide angle of view, made up by the CCD cameras 3, it is determined whether or not the oncoming vehicle exists on the basis of the speed components Vnx and Vnz of a backwardly moving object respectively in the longitudinal and lateral directions of the own vehicle 1. Hence, even in the case where the oncoming vehicle apparently moves in the image screen, for example, from obliquely left ahead of the own vehicle 1 toward obliquely right behind of the same, the oncoming vehicle can be properly detected. That is, by properly setting first and second thresholds concerning the speed components Vnz and Vnx of 3D objects on the basis of the fundamental principle that, when making a turn to the right at the intersection, the oncoming vehicle has a speed component so as to come closer to the own vehicle 1 from ahead of the same and also does not move leftward in the image screen, the oncoming vehicle can be properly detected even when the own vehicle 1 confronts the opposite lane and the like at a predetermined angle.

Although the assist apparatus according the present embodiment has an example structure in which a driver is informed of existence of the oncoming vehicle by using the alarm lamp 9 and the warning buzzer 10, the assist apparatus is not limited to the above structure and may have a structure in which, for example, only one of the alarm lamp 9 and the warning buzzer 10 gives a warning, or alternatively, a sound-warning device is provided. In addition, the assist apparatus may have a structure in which not only a warning is given to a driver, but also a braking function (such as a throttle control, a transmission control, or a braking control) is additionally provided in the own vehicle 1 so as to inhibit acceleration, starting from standstill, and the like of the own vehicle 1 when the oncoming vehicle exists.

Also, although the assist apparatus according to the present embodiment has a structure in which the imaging device is made up by the pair of CCD cameras 3, the imaging device is not limited to the above structure and may be formed by a single lens camera. Those skilled in the art will appreciate that the present invention is applicable to this case by detecting position information of 3D objects such as the oncoming vehicle with a radar device using laser light, radio waves, acoustic waves, electromagnetic waves, or the like and by processing the position information into coordinates on the screen image by applying a known image recognition technique.

In addition, although the present embodiment is described on the assumption that a cruising lane is installed on the basis of the left-hand traffic rule, it will be appreciated that the present invention is applicable even to the right-hand traffic rule by replacing words "right" and "left" with each other in the description.

Meanwhile, although a method for detecting the oncoming vehicle depends on a turning state of the own vehicle 1, and an example method in which, after the own vehicle 1 has reached a predetermined turning state, the oncoming vehicle is detected on the basis of the speed components Vnz and Vnx of 3D objects in the longitudinal and lateral directions of the own vehicle 1, respectively, is described in the foregoing embodiment, the present invention is not limited to the above method. Alternatively, by setting a second threshold concerning the speed component Vnx in the lateral direction of the own vehicle 1 at a negative value (for example, −5.4 km/h), a series of detecting operations of the oncoming vehicle from start to finish of making a turn to the right of the own vehicle 1 may be performed on the basis of speed components of 3D objects in the longitudinal and lateral directions of the own vehicle 1. In this case, since the own vehicle 1 and the oncoming vehicle are substantially parallel to each other in a turning start state, compared to a state in which the own vehicle 1 has reached the predetermined turning state, the speed component Vnz in the longitudinal direction of the own vehicle 1 is needed to be set at a smaller value (for example, −18 km/h) than that in the foregoing embodiment. When an own cruising lane has a rightward curve ahead of the own vehicle 1, the speed component Vnx of the oncoming vehicle running on the curve in the lateral direction of the own vehicle 1 varies from a negative value toward a positive value as the oncoming vehicle comes closer to the intersection. Hence, even when the own cruising lane has a curve ahead of the own vehicle, the oncoming vehicle is properly detected by setting the second threshold at an appropriate negative value without wrongly detecting a vehicle making a turn to the right as the oncoming vehicle.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle drive assist apparatus, comprising:

forward-environment-recognizing means for stereoscopically recognizing at least one three-dimensional object ahead of an own vehicle by processing images captured by an imaging device installed in the own vehicle; and oncoming-vehicle-detecting means, detecting the three-dimensional object, for having a speed component not lower than a first threshold in the longitudinal direction of the own vehicle and in a direction along which the three-dimensional object is coming closer to the own vehicle and for having another speed component not lower than a second threshold in a turning direction of the own vehicle, as an oncoming vehicle when the own vehicle is making a turn at an intersection.

2. The vehicle drive assist apparatus according to claim 1, further comprising turning-occasion-determining means for determining a turning occasion of the own vehicle at the intersection on the basis of a turn signal operation of a driver and an own vehicle speed.

3. The vehicle drive assist apparatus according to claim 1, wherein the oncoming-vehicle-detecting means detects the three-dimensional object continuously recognized in a plurality of frames as the oncoming vehicle.

4. The vehicle drive assist apparatus according to claim 1, further comprising notifying means for notifying a driver of detection of the oncoming vehicle.

5. The vehicle drive assist apparatus according to claim 4, wherein the notifying means changes the way of notification in accordance with a position of the oncoming vehicle.

6. A vehicle drive assist apparatus, comprising:

forward-environment-recognizing means for stereoscopically recognizing at least one three-dimensional object ahead of an own vehicle by processing images captured by an imaging device installed in the own vehicle; and oncoming-vehicle-detecting means which detects the three-dimensional object, for running in an opposite lane juxtaposed to the own cruising lane toward the own vehicle, as an oncoming vehicle when the own vehicle is making a turn at an intersection before reaching a predetermined turning state and for having a speed component not lower than a first threshold in the longitudinal direction of the own vehicle and in a direction along which the three-dimensional object is coming closer to the own vehicle and having another speed component not lower than a second threshold in a turning direction of the own vehicle, as the oncoming vehicle when the own vehicle is making a turn at the intersection after reaching the predetermined turning state.

7. The vehicle drive assist apparatus according to claim 6, further comprising turning-occasion-determining means for determining a turning occasion of the own vehicle at the intersection on the basis of a turn signal operation of a driver and an own vehicle speed.

8. The vehicle drive assist apparatus according to claim 6, further comprising turning-state-determining means for determining a turning state of the own vehicle making a turn at the intersection on the basis of an own vehicle speed and a steering wheel angle.

9. The vehicle drive assist apparatus according to claim 6, further comprising turning-state-determining means for determining a turning state of the own vehicle making a turn at the intersection on the basis of navigation information.

10. The vehicle drive assist apparatus according to claim 6, wherein the oncoming-vehicle-detecting means detects the three-dimensional object continuously recognized in a plurality of frames as the oncoming vehicle.

11. The vehicle drive assist apparatus according to claim 6, further comprising notifying means notifying a driver of detection of the oncoming vehicle.

12. The vehicle drive assist apparatus according to claim 11, wherein the notifying means changes the way of notification in accordance with a position of the oncoming vehicle.

* * * * *